United States Patent [19]

Rödel et al.

[11] Patent Number: 4,562,523
[45] Date of Patent: Dec. 31, 1985

[54] POWER SUPPLY

[75] Inventors: Gerhard Rödel, Igensdorf; Werner Wölfel, Stuttgart, both of Fed. Rep. of Germany

[73] Assignee: International Standard Electric Corporation, New York, N.Y.

[21] Appl. No.: 575,437

[22] Filed: Jan. 31, 1984

[30] Foreign Application Priority Data

Feb. 4, 1983 [DE] Fed. Rep. of Germany ....... 3303782

[51] Int. Cl.$^4$ ........................................... H02M 3/335
[52] U.S. Cl. ...................................... 363/21; 363/97; 363/56
[58] Field of Search .................... 323/285; 363/21, 56, 363/57, 97; 307/43, 52, 53, 60, 62, 86, 553, 557, 560

[56] References Cited

U.S. PATENT DOCUMENTS 4,177,389 12/1979 Schott .................................. 307/53

Primary Examiner—Peter S. Wong
Assistant Examiner—Judson H. Jones
Attorney, Agent, or Firm—John T. O'Halloran; Peter R. Ruzek

[57] ABSTRACT

In a power supply consisting of parallel-connected converters, each of the converters includes a current sensor. One terminal of each current sensor is connected to one terminal of each of the other current sensors. The other terminal is connected to the converter's pulse-width modulator through a limiter. If any of the converters fails, the limiter ensures that only a small, limited change occurs in the output voltages of the other converters which is permissible in most cases.

4 Claims, 2 Drawing Figures

POWER SUPPLY

BACKGROUND OF THE INVENTION

The present invention relates to a power supply including at least two parallel switching supply modules each of which includes a current sensor having a terminal which is connected to an error amplifier included in an output-voltage regulating circuit.

Such a power supply, which permits current sharing between the switching-supply modules, is disclosed in DE-OS 30 12 728. The voltage delivered by each current sensor, which is proportional to the current in the respective switching-supply module, is applied from one terminal to the corresponding terminals of the other switching-supply modules and from the other terminal through a voltage divider, to which a reference voltage is applied, to one input of the error amplifier. The output of the switching-supply module is coupled through another voltage divider to the other input of the error amplifier.

When any of the parallel switching-supply modules fails or is switched off, it cannot deliver a voltage proportional to the current. This falsifies the regulation in the other switching-supply modules.

SUMMARY OF THE INVENTION

The object of the invention is to provide a power supply of the above kind wherein inactive switching-supply modules affect the output-voltage regulation as little as possible.

This object is attained by interposing a limiter into the connection between the aforementioned terminal and the error amplifier.

By the measure according to the invention, the influence of the current sharing on the output voltage of the respective switching-supply module is limited. As a result, a large change in the voltage proportional to the current can be permitted for a small current change, so that the current is shared substantially equally between the parallel modules. An inactive switching-supply module therefore causes only a small output-voltage change in the other module, which is permissible in most cases.

BRIEF DESCRIPTION OF THE DRAWING

Embodiments of the invention will now be explained in more detail with reference to the accompanying drawing, in which.

DETAILED DESCRIPTION OF THE PREFERRED EMBODIMENTS

Figures 1, 2:
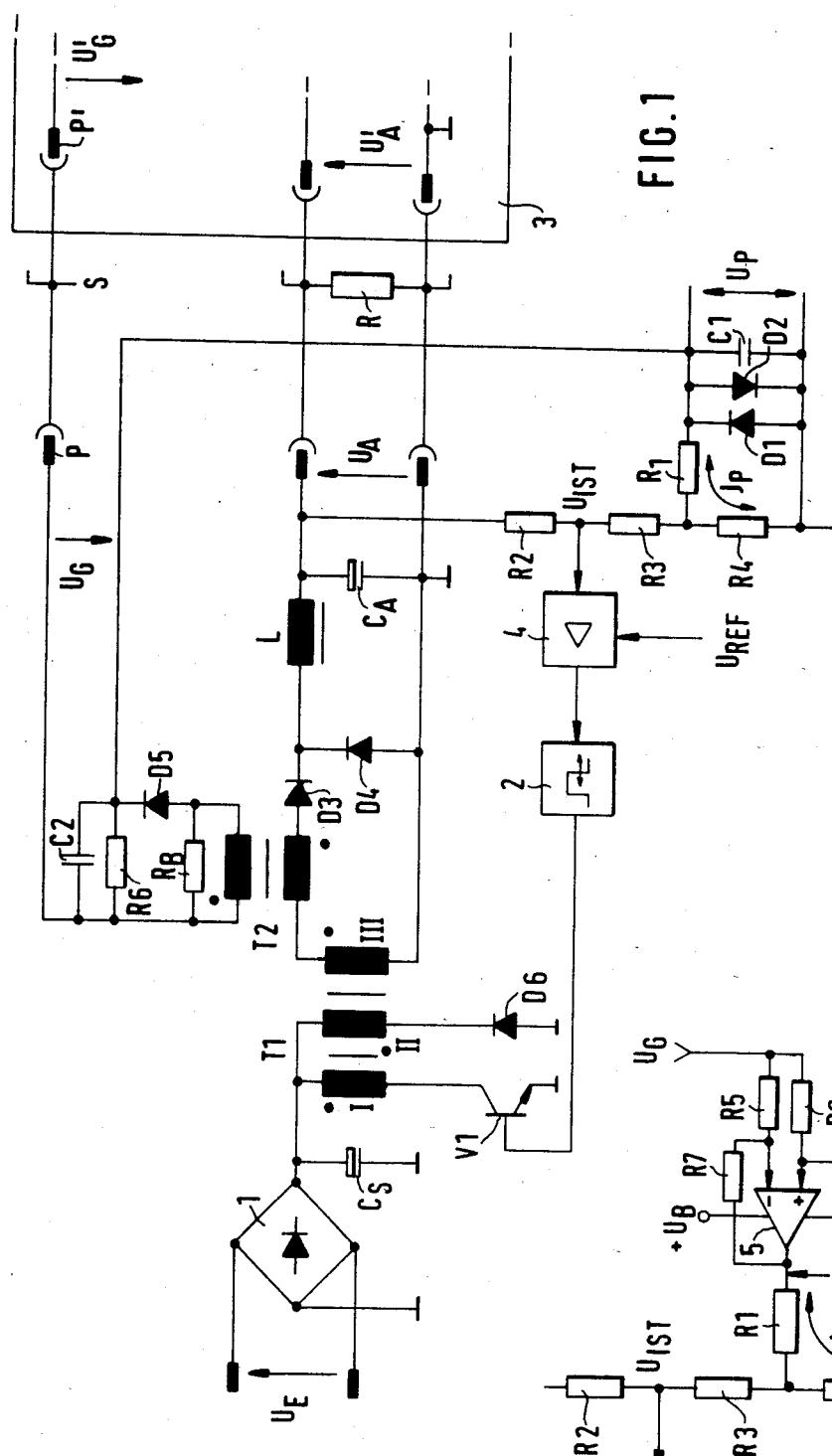
FIG. 1 is a circuit diagram of a power supply consisting of two switching-supply modules.
FIG. 2 is a circuit diagram of another embodiment of the limiter of FIG. 1.

The invention will be described with respect to switching-supply modules using single-ended forward converters, but it is to be understood that any other type of converter may be used in the modules.

A DC input voltage $U_E$ is applied to a bridge rectifier 1 of a first switching-supply module. The bridge rectifier has its output connected to a capacitor $C_S$. If the input voltage is a DC voltage, the bridge rectifier can be dispensed with. The direct voltage so obtained drives a current through the primary winding I of a power transformer T1 in series with a power transistor V1. The latter is controlled by a pulse-width modulator 2. Connected in parallel with the primary winding I is a demagnetizing winding II in series with a diode D6.

The secondary winding III of the power transformer T1 is connected to the primary winding of a current transformer T2 acting as current sensor, to a rectifier diode D3, a flywheel diode D4, a filter and storage choke L, and a filter capacitor $C_A$ in the usual manner. The output terminals deliver a regulated voltage $U_A$ to a load R. A second switching-supply module 3 (shown partly), delivering an output voltage $U_A'$, is connected in parallel with the load R, and it is possible to connect further switching-supply modules in parallel, which is indicated by the short strokes at the points of connection of the load R. All switching-supply modules are of the same design.

To maintain the output voltage $U_A$ at a predetermined value, this voltage is applied to a voltage divider consisting of resistors R2, R3, and R4. A tap between the resistors R2 and R3 makes the actual value $U_{IST}$ of the output voltage $U_A$ available to an error amplifier 4. A reference voltage $U_{REF}$ is applied to the second input of this amplifier. The resulting control signal controls the pulse-width modulator 2 so that the predetermined value of the output voltage $U_A$ is obtained.

The secondary winding of the current transformer T2, which is used as a current sensor, is terminated with a burden resistor $R_B$, which is followed by a rectifier and filter circuit consisting of a diode D5, a discharge resistor R6, and a filter capacitor C2. The voltage delivered by this circuit, $U_G$, is proportional to the current flowing through the secondary winding III of the power transformer T1, and its polarity is indicated by an arrow at the reference character $U_G$. The values of the components of the current sensor are chosen so that the voltage $U_G$ is large. A small current change then causes a large voltage change.

The current sensor may also be connected directly ahead of the filter and storage choke L, ahead of the primary winding of the power transformer T1, or ahead of or behind the power transistor V1.

One terminal of the current sensor, in FIG. 1 the negative terminal, is connected to a terminal P, which is connected via a neutral point S to the terminal P' of the second switching-supply module 3. If further switching-supply modules are connected in parallel, the further terminals P are connected to this neutral point S.

The other terminal, in FIG. 1 the positive terminal, is connected via a limiter to the voltage divider consisting of the resistors R2, R3, and R4. The limiter consists of two back-to-back diodes D1 and D2 which are shunted by a capacitor C1 and connected to the node of the resistors R3 and R4 through a decoupling resistor R1. The voltage across the limiter is designated $U_P$; its maximum is equal to the forward voltage of the diodes D1, D2. The maximum level of the voltage $U_P$ changes the output voltage $U_A$ by a maximum of ±1%, for example. This is effected by a current $I_P$ flowing, additively or subtractively, through the decoupling resistor R1 and the resistor R4 at the bottom end of the voltage divider. This influences the regulation of the output voltage $U_A$ in such a way that the latter drives a larger or smaller current through the load R, depending on whether the current load was too small or too large. Thus the current load is shared equally between the parallel-coupled switching-supply modules.

FIG. 2 shows a different limiter. This limiter contains an operational amplifier 5, to which a positive supply voltage $+U_B$ and a negative supply voltage $-U_B$ are applied. The current-sensor voltage $U_G$ is applied to the inverting input of the operational amplifier 5 through a resistor R5, and the noninverting input is connected to the reference voltage $U_{REF}$ and, through a resistor R6, to the voltage $U_A$. The output of the operational amplifier 5 is coupled to the decoupling resistor R1 and through a resistor R7 to the inverting input. The operational amplifier 5 is connected as a proportional controller whose output voltage—which is equal to the voltage $U_P$—can assume a maximum value equal to the value of the supply voltage $+U_B$ or $-U_B$. Limiting can thus be provided by selecting the supply voltage $U_B$ and thus determining the maximum voltage $U_P$.

We claim:

1. Power supply consisting of at least two parallel switching-supply modules each containing a current sensor having a first terminal which is connected by a connection to an error amplifier forming part of an output-voltage-regulating circuit acting on a pulse-width modulator, and a second terminal which is connected to the corresponding second terminal of the current sensor of the respective other of the at least two switching-supply modules, characterized in that the connection of the second terminal to the error amplifier (4) incorporates a limiter ($D_1$, $D_2$; 5).

2. A power supply as claimed in claim 1, characterized in that the limiter consists of two diodes ($D_1$, $D_2$) connected in inverse parallel.

3. A power supply as claimed in claim 1, characterized in that the limiter includes an operational amplifier (5) connected as a proportional controller.

4. A power supply as claimed in claim 3, characterized in that the operational amplifier is connected to a positive supply voltage ($+U_B$) and a negative supply voltage ($-U_B$).

* * * * *